US012629877B2

(12) United States Patent
Yu et al.

(10) Patent No.: US 12,629,877 B2
(45) Date of Patent: May 19, 2026

(54) INTERMITTENT EXTRUSION SYSTEM AND EXTRUSION DEVICE

(71) Applicant: WUYI UNIVERSITY, Jiangmen (CN)

(72) Inventors: Huiwen Yu, Jiangmen (CN); Haowen Chen, Jiangmen (CN); Baiping Xu, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 64 days.

(21) Appl. No.: 18/678,197

(22) Filed: May 30, 2024

(65) Prior Publication Data

US 2025/0303626 A1     Oct. 2, 2025

(30) Foreign Application Priority Data

Mar. 26, 2024     (CN) .......................... 202410349070.1

(51) Int. Cl.
| *B29C 48/42* | (2019.01) |
| *B29C 48/25* | (2019.01) |
| *B29C 48/41* | (2019.01) |
| *B29C 48/61* | (2019.01) |

(52) U.S. Cl.
CPC .......... B29C 48/42 (2019.02); B29C 48/2517 (2019.02); B29C 48/2694 (2019.02); B29C 48/41 (2019.02); B29C 48/61 (2019.02)

(58) Field of Classification Search
CPC ............ B29C 48/2517; B29C 48/2694; B29C 48/405; B29C 48/41; B29C 48/42; B29C 48/595; B29C 48/61
See application file for complete search history.

(56) References Cited

U.S. PATENT DOCUMENTS

| 3,506,066 | A | * | 4/1970 | Nonnenmacher ....... B08B 1/165 366/301 |
| 5,035,509 | A | | 7/1991 | Kruder |
| 11,485,063 | B2 | * | 11/2022 | Xu .......................... B29B 7/489 |

FOREIGN PATENT DOCUMENTS

| CN | 106926430 A | 7/2017 |
| CN | 113453866 A | 9/2021 |
| JP | 2001038490 A | 2/2001 |
| JP | 2005144716 A | 6/2005 |

OTHER PUBLICATIONS

The State Intellectual Property Office of People's Republic of China. First Search Report for CN Application No. 202410349070.1 and English translation, mailed Jul. 29, 2025, pp. 1-6.

* cited by examiner

*Primary Examiner* — Xiao S Zhao
*Assistant Examiner* — Joseph S Leyson
(74) *Attorney, Agent, or Firm* — Vivacqua Crane, PLLC

(57) ABSTRACT

An intermittent extrusion system and an extrusion device are disclosed. The intermittent extrusion system includes a barrel and an extrusion unit. The extrusion unit includes a first screw and a second screw, both the first screw and the second screw are installed in the barrel and can rotate in the barrel, a screw thread of the first screw can mesh with a screw groove of the second screw, the first screw has at least one thread start, and the second screw has at least one thread start. The first screw rotates at a constant speed, while the second screw rotates intermittently, and a rotating direction of the first screw is opposite to that of the second screw.

5 Claims, 9 Drawing Sheets

1

INTERMITTENT EXTRUSION SYSTEM AND EXTRUSION DEVICE

CROSS-REFERENCE TO RELATED APPLICATION

This application is based on and claims the benefit of priority from Chinese Patent Application No. 202410349070.1, filed on 26 Mar. 2024, the entirety of which is incorporated by reference herein.

TECHNICAL FIELD

The present disclosure relates to the technical field of twin-screw extrusion, specifically focusing on an intermittent extrusion system and an extrusion system.

BACKGROUND

The traditional extrusion process primarily involves continuously driving materials through a twin-screw mechanism. The current dual-screw design is balanced in terms of left-right symmetry, resulting in equal forces on both sides. However, this configuration lacks interaction between the front and rear screw grooves, limiting spatial progression during the flow process and hindering the mixing performance of the materials, thereby adversely affecting the processing quality.

SUMMARY

The present disclosure aims to solve at least some extent of the technical problems in the existing technology. To this end, the present disclosure provides an intermittent extrusion system that can improve the dispersion and mixing of materials, enhancing their mixing properties.

The present disclosure further provides an extrusion device with the intermittent extrusion system.

According to embodiments in the first aspect of the present disclosure, an intermittent extrusion system is provided, including a barrel and an extrusion unit. The extrusion unit consists of a first screw and a second screw, both of which are installed in the barrel. Both screws can rotate within the barrel, with the screw thread of the first screw meshing with the screw groove of the second screw. The first screw has at least one thread start, and the second screw has at least one thread start. The first screw is configured to rotate at a constant speed, while the second screw is configured to rotate intermittently. The rotating direction of the first screw is opposite to that of the second screw.

The intermittent extrusion system provided by the embodiments of the present disclosure has at least the following beneficial effects. Both the first screw and the second screw are installed in the barrel, and they can both rotate within it. The first screw meshes with the second screw. The first screw has at least one thread start, and the second screw also has at least one thread start. When the first screw is driven to rotate at a constant speed, the screw thread of the first screw meshes with or disengages from the screw groove of the second screw, allowing the second screw to move intermittently. The screw thread of the first screw drives the compression and extrusion of the material into the screw groove of the second screw, enabling continuous segmentation and displacement of the material. In the next cycle, the screw thread of the first screw scrapes the material out of the screw groove of the second screw, so that the first screw and the second screw have a good self-cleaning ability. This process subjects the material to continuous stretching, shearing, segmentation, and displacement to accelerate the plasticization of the material and enhance the mixing of the material. Moreover, the material can move from the screw groove of the second screw to the screw thread of the first screw and remain there, enabling it to be stretched and aiding in the recovery of oriented high molecular chains. The repeated stretching and recovery process from different directions strengthens the homogenization of the material and improves the processing quality.

According to certain embodiments of the present disclosure, the inner diameter of both the first screw and the second screw is d, and the outer diameter of both screws is D. The center distance between the first screw and the second screw is $C=(D+d)/2$. The number of thread starts for the first screw is denoted as n, and the number of thread starts of the second screw is denoted as m. The following constraints must be satisfied: $n \leq 3$ and $m \leq 5$;

The end face curve of the first screw is composed of an arc segment $N_1N_2$, a curve segment $N_2N_3$, an arc segment $N_3N_4$, and a curve segment $N_4N_5$. Similarly the end face curve of the second screw also consists of an arc segment $M_1M_2$, a curve segment $M_2M_3$, an arc segment $M_3M_4$, and a curve segment $M_4M_5$. The curve segment $N_2N_3$ corresponds to the curve segment $M_2M_3$, the arc segment $N_3N_4$ corresponds to the arc segment $M_3M_4$, and the curve segment $N_4N_5$ corresponds to the curve segment $M_4M_5$;

A rectangular plane coordinate system xoy is established. The end face center of the first screw is located at $O_1$, and the end face center of the second screw is located at $O_2$. The coordinates of the end face center $O_1$ of the first screw are $(a, b)$, and the coordinates of the end face center $O_2$ of the second screw are $(0,0)$. The included angle between a connecting line of a point on the end face curve of the first screw and the end face center $O_1$ and the line connecting $O_1$ and $O_2$ is denoted as $\theta_1$. Similarly, the included angle between a connecting line of a point on the end face curve of the second screw and the end face center $O_2$, and the line connecting $O_1$ and $O_2$, is denoted as $\theta_2$;

the equation of the arc segment $N_1N_2$ is:

$$\begin{cases} x = a + d/2 \cdot \cos\theta_1 \\ y = b + d/2 \cdot \sin\theta_1 \end{cases};$$

where $\theta_1 \in (-\pi/2m, 2\pi/n - 3\pi/2m]$;
the equation of the curve segment $N_2N_3$ is:

$$\begin{cases} x = a + C \cdot \cos\theta_1 - D/2 \cdot \cos(\pi/2m - 2\theta_1) \\ y = b - C \cdot \sin\theta_1 - D/2 \cdot \sin(\pi/2m - 2\theta_1) \end{cases};$$

where $\theta_1 \in (\pi/2m - \arccos(C/D), \pi/2m]$;

$$\begin{cases} x = a + D/2 \cdot \cos\theta_1 \\ y = b + D/2 \cdot \sin\theta_1 \end{cases};$$

the equation of the arc segment $N_3N_4$ is:
where $\theta_1 \in (-\pi/2m + (2m-1)\pi/m, \pi/2m + (2m-1)\pi/m]$;
the equation of the curve segment $N_4N_5$ is:

$$\begin{cases} x = a + C \cdot \cos\theta_1 - D/2 \cdot \cos(3\pi/2m - 2\theta_1) \\ y = b - C \cdot \sin\theta_1 - D/2 \cdot \sin(3\pi/2m - 2\theta_1) \end{cases};$$

3 where $\theta_1 \in (3\pi/2m, 3\pi/2m+\arccos(C/D)]$;

$$\begin{cases} x = d/2 \cdot \cos\theta_2 \\ y = d/2 \cdot \sin\theta_2 \end{cases};$$

the equation of the arc segment $M_1M_2$ is:
where $\theta_2 \in (-\pi/2m, \pi/2m]$;
the equation of the curve segment $M_2M_3$ is:

$$\begin{cases} x = C \cdot \cos\theta_2 - D/2 \cdot \cos(\pi/2m - 2\theta_2) \\ y = -C \cdot \sin\theta_2 - D/2 \cdot \sin(\pi/2m - 2\theta_2) \end{cases};$$

where $\theta_2 \in (\pi/2m-\arccos(C/D), \pi/2m]$;
the equation of the arc segment $M_3M_4$ is:

$$\begin{cases} x = D/2 \cdot \cos\theta_2 \\ y = D/2 \cdot \sin\theta_2 \end{cases};$$

where $\theta_2 \in (-\pi/2m+(2m-1)\pi/m, \pi/2m+(2m-1)\pi/m]$;
the equation of the curve segment $M_4M_5$ is:

$$\begin{cases} x = C \cdot \cos\theta_2 - D/2 \cdot \cos(3\pi/2m - 2\theta_2) \\ y = -C \cdot \sin\theta_2 - D/2 \cdot \sin(3\pi/2m - 2\theta_2) \end{cases};$$

where $\theta_2 \in (3\pi/2m, 3\pi/2m+\arccos(C/D)]$.

According to some embodiments of the present disclosure, the first screw and the second screw are arranged in a staggered manner. The stagger angle of the first screw is $\varphi_1$, and the stagger angle of the second screw is $\varphi_2$. The stagger direction of the first screw is opposite to that of the second screw, and the following constraint is satisfied:

$$\varphi_1 = \varphi_2 \leq \frac{\pi}{m}.$$

According to some embodiments of the present disclosure, after forming the end face curve of the first screw, the end face of the first screw rotates clockwise around the end face center $O_1$ by $\pi-\pi/n-\pi/m$ to define the initial position of the first screw;

After forming the end face curve of the second screw, the end face of the second screw rotates anticlockwise around the end face center $O_2$ by $\pi/m$ to define the initial position of the second screw;

The first screw has a rotational angular velocity of $\omega$, while the second screw is in the following motion state:

When the screw thread of the first screw is in contact with the screw thread of the second screw for the first time:

static time: $t_1 \in (0, t_{1max}]$;
motion time: $t_2 \in (t_{1max}, t_{1max}+(2\pi/m+(\pi/2)/\omega]$;
static time: $t_3 \in (t_{2max}, t_{2max}+(2\pi/n-2\pi/m)/\omega]$;
when the screw thread of the first screw is in contact with the screw thread of the second screw for the second time and thereafter:

motion time: $t_4 \in (t_{3max}, t_{3max}+\pi/m]$;
static time: $t_5 \in (t_{4max}, t_{4max}+2\pi/n-2\pi/m]$;
where $t_{1max}=(\pi/n-\pi/m)/\omega$, and $t_{Qmax}$ represents the right boundary of a range of values for $t_{Q-1}$.

4

According to some embodiments of the present disclosure, in the length direction of the barrel, the screw thread of the first screw and the screw thread of the second screw are designed in a wave shape.

According to embodiments in the second aspect of the present disclosure, an extrusion device is provided, which includes the intermittent extrusion system provided in the first aspect of the present disclosure.

The extrusion device provided by the embodiments of the present disclosure has at least the following beneficial effects. The intermittent extrusion system provided by the embodiments in the first aspect of the present disclosure introduces asymmetric effects, enabling asymmetry in both the left-right and front-rear screw groove configurations. Through the periodic changes of motion, rest, and motion experienced by the material during the conveying process, the material undergoes a cyclic process of stretching, shearing, recovery, and further stretching and shearing. Moreover, the intermeshing of the left-right and front-rear screw groove configurations is achieved, which increases the interfacial area and the possibility of uniform distribution in multiphase systems, thereby improving the dispersion and mixing effect of the material.

Additional aspects and advantages of the present disclosure will be provided in part in the following description and will become apparent in part from the following description or be learned by practice of the present disclosure.

BRIEF DESCRIPTION OF DRAWINGS

The above and/or additional aspects and advantages of the present disclosure will become apparent and readily understood from the description of embodiments presented in conjunction with the following accompanying drawings, in which.

Figure 1:
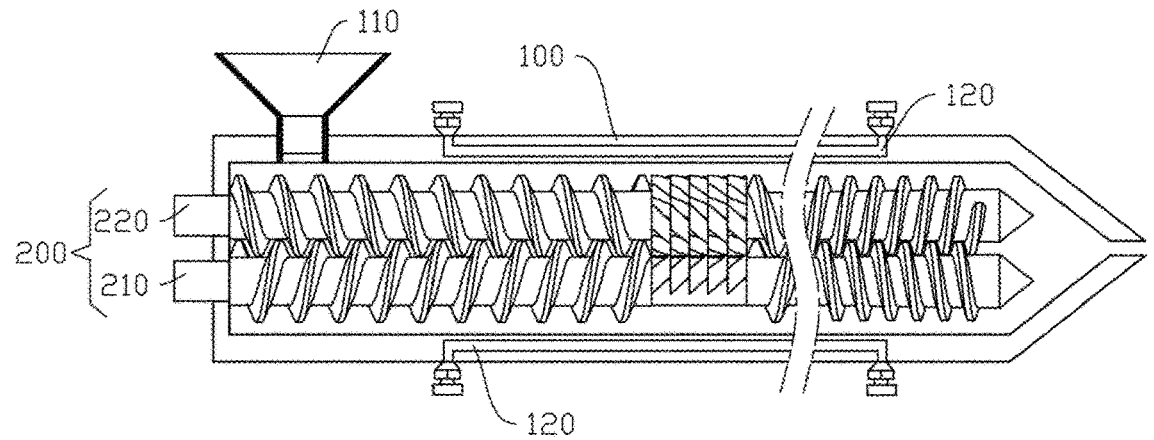
FIG. 1 is a schematic diagram of an intermittent extrusion system according to an embodiment in a first aspect of the present disclosure.

DESCRIPTION OF REFERENCE NUMERALS barrel 100,
feed inlet 110,
heating mechanism 120;
extrusion unit 200,
first screw 210,
second screw 220;
first motor 311,
first speed reducer 312,
second motor 321,
second speed reducer 32.

DETAILED DESCRIPTION

Embodiments of the present disclosure will be described in detail below. Examples of the embodiments are illustrated in the accompanying drawings, where the same or similar reference numerals throughout the drawings indicates the same or similar elements with corresponding functions. The embodiments described below with reference to the accompanying drawings are exemplary and are intended only to explain the present disclosure instead of being construed as limiting the present disclosure.

In the description of the present disclosure, it should be understood that descriptions related to orientation, for example, orientation or positional relationships indicated by "up", "down", "front", "back", "left", "right", etc. are based on the orientation or positional relationships shown in the accompanying drawings. These terms are used to facilitate and simplify the description of the present disclosure, rather than indicating or implying that the apparatus or element referred to must have a specific orientation or be constructed and operated in a specific orientation, and therefore cannot be construed as limiting the present disclosure.

In the description of the present disclosure, the term "several" means one or more; "a plurality of" means two or more; "greater than,", "less than,", "more than,", etc. are to be interpreted as excluding the specified number; and "above,", "below,", "within,", etc. are to be interpreted as including the specified number. If "first" and "second,", etc. are mentioned to, it is only for the purpose of distinguishing technical features. This should not be interpreted as indicating relative importance, the number of the indicated technical features, or the sequence of the technical features.

In the description of the present disclosure, unless explicitly defined otherwise, the terms like "arrange," "install," and "connect" should be interpreted broadly. Those with ordinary skills in the art can determine the specific meanings of the above terms in the present disclosure in a rational way in conjunction with the specific contents of the technical schemes.

Figure 2:
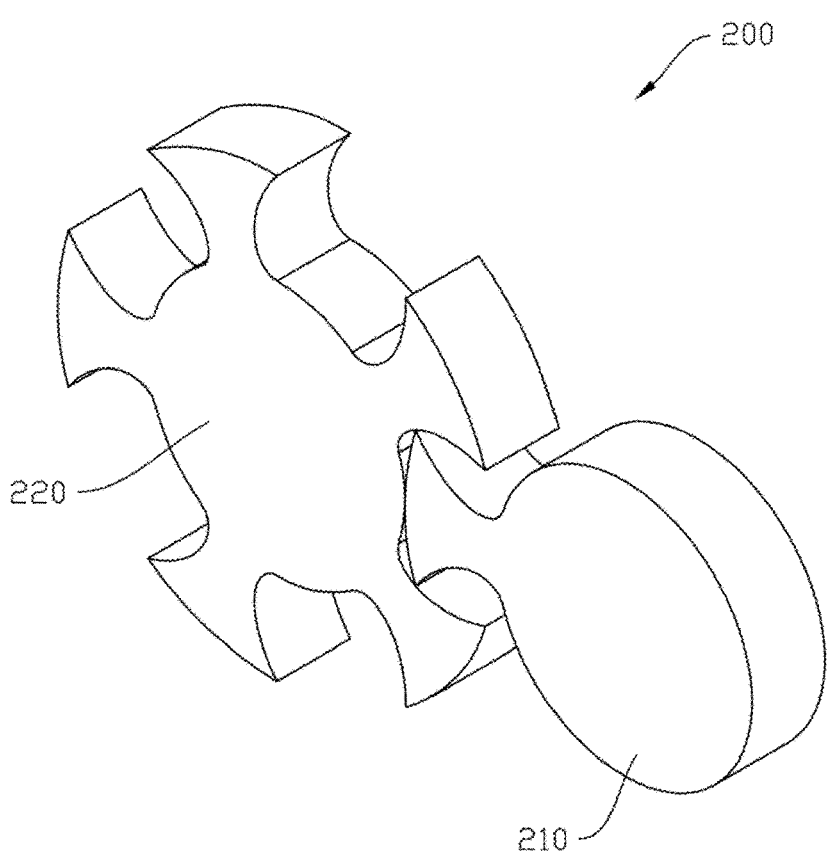
FIG. 2 is a schematic diagram of the first extrusion unit of the intermittent extrusion system according to an embodiment in the first aspect of the present disclosure.
Figure 3:
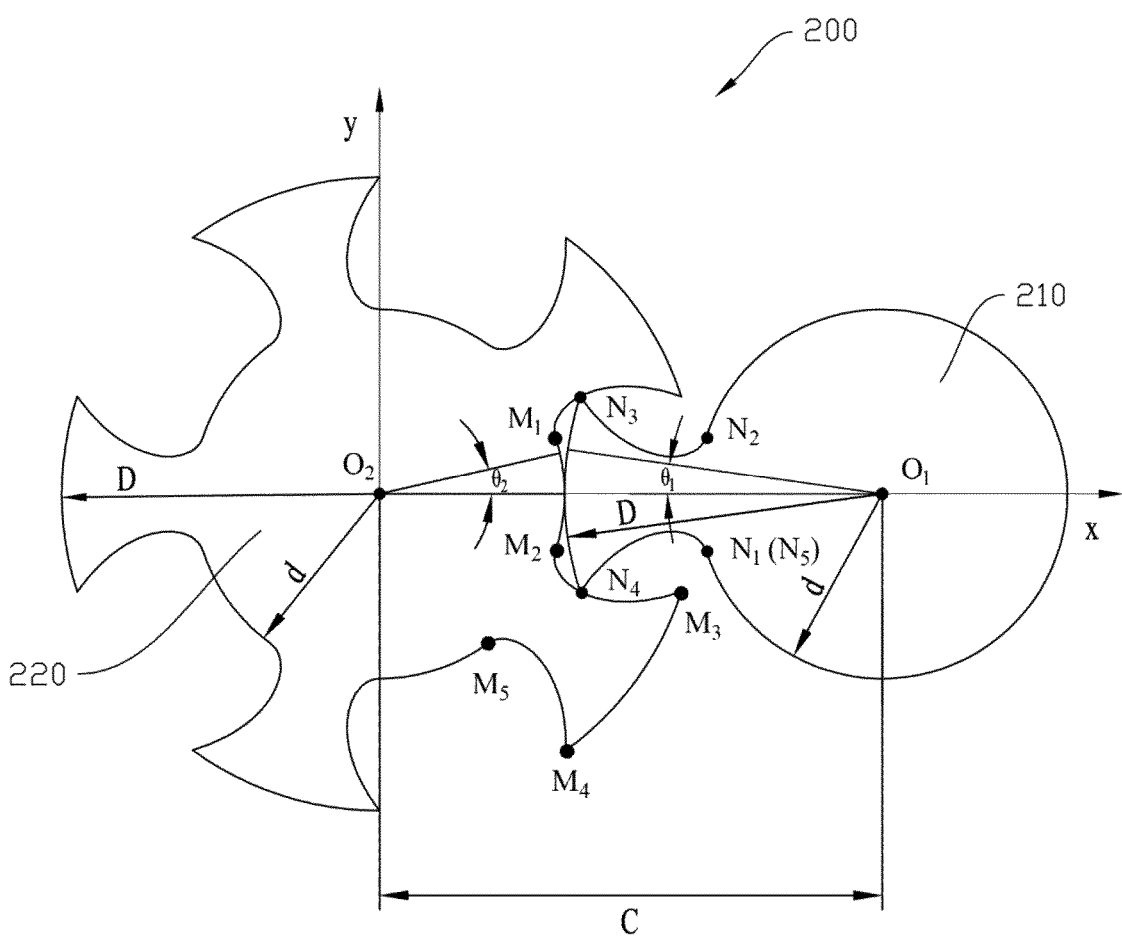
FIG. 3 is a schematic diagram of an extrusion unit, featuring m=5 and n=1, of the intermittent extrusion system according to an embodiment in the first aspect of the present disclosure.

As can be understood with reference to FIGS. 1-3, an intermittent extrusion system, according to an embodiment in a first aspect of the present disclosure, includes a barrel 100 and an extrusion unit 200. The extrusion unit 200 includes a first screw 210 and a second screw 220, both of which are installed in the barrel 100. Both screws can rotate within the barrel 100. The screw thread of the first screw 210 meshes with the screw groove of the second screw 220. The first screw 210 has at least one thread start, and the second screw 220 also has at least one thread start. The first screw 210 rotates at a constant speed, while the second screw 220 rotates intermittently, and the rotating direction of the first screw 210 is opposite to that of the second screw 220.

Because both the first screw 210 and the second screw 220 are installed in the barrel 100, both the first screw 210 and the second screw 220 can rotate in the barrel 100, the first screw 210 meshes with the second screw 220. The first screw 210 has at least one thread start, and the second screw 220 also has at least one thread start. When the first screw 210 is driven to rotate at a constant speed, the screw thread of the first screw 210 mesh with or disengage from the screw groove of the second screw 220, so that the second screw 220 can move intermittently. The screw thread of the first screw 210 drives the compression and extrusion of the material into the screw groove of the second screw 220, enabling continuous segmentation and displacement of the material. In the next cycle, the screw thread of the first screw 210 scrapes the material out of the screw groove of the second screw 220. Asymmetric effects are introduced to the screw spatial structure, enabling asymmetry in both the left-right and front-rear screw groove configurations. Through the periodic changes of motion, rest, and motion experienced by the material during the conveying process, the material undergoes constant stretching, shearing, segmentation, and displacement, so as to accelerate the plasticization of the material and strengthen the mixing of the material. Moreover, the material can move from the screw groove of the second screw 220 to the screw thread of the first screw 210 and stay there, allowing it to be stretched and facilitating the recovery of oriented high molecular chains. The repeated stretching and recovery process from different directions strengthens the homogenization of the material and improves the processing quality.

Here, the first screw 210 rotates at a constant speed, while the second screw 220 rotates intermittently. This allows the material to move between the two screws, undergoing constant stretching, recovery processes. Consequently, this enhances the material's homogenization and plasticization.

Figure 12:
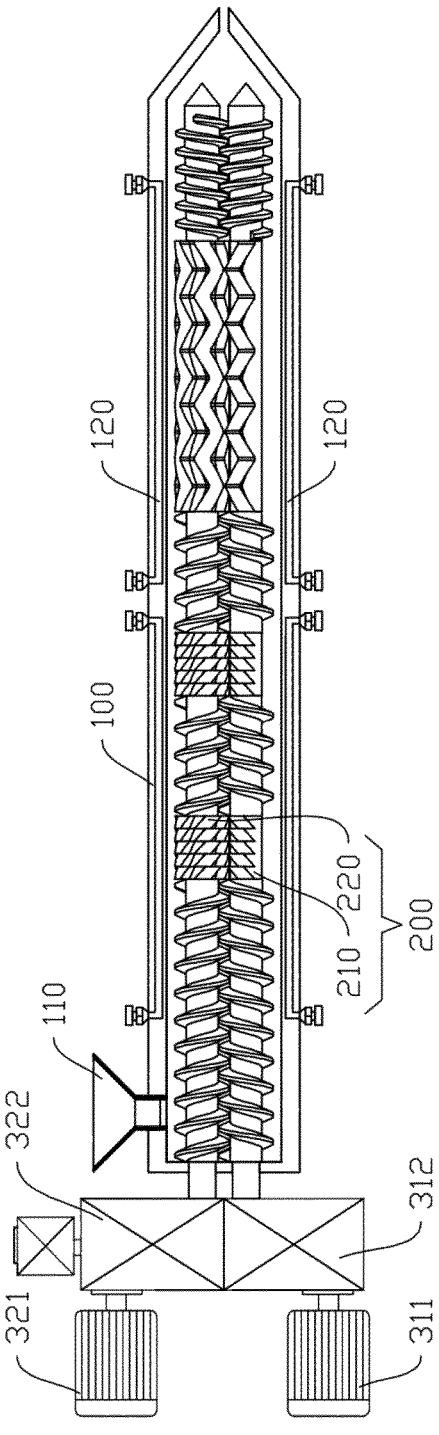
FIG. 12 is a schematic diagram of the extrusion device according to an embodiment in the second aspect of the present disclosure.

It should be noted that, with reference to FIGS. 2 and 12, the first screw 210 is driven by a first driving mechanism, and the second screw 220 is driven by a second driving mechanism. The first driving mechanism includes a first motor 311 and a first speed reducer 312. The first motor 311 is connected to the input end of the first speed reducer 312, and the output end of the first speed reducer 312 is connected to the first screw 210. The second driving mechanism includes a second motor 321 and a second speed reducer 322. The second motor 321 is connected to the input end of the second speed reducer 322, and the output end of the second speed reducer 322 is connected to the second screw 220. The first motor 311 drives the first screw 210 to rotate at a constant speed so that the screw thread of the first screw 210 can fit into the screw groove of the second screw 220. Subsequently, the second motor 321 drives the second screw 220 to rotate, allowing the first screw 210 and the second screw 220 can engage with each other. The second motor 321 drives the second screw 220 to rotate intermittently. The screw thread of the first screw 210 meshes with the screw groove of the second screw 220, so that the dispersion and mixing effect of the material can be improved and the mixing properties can be strengthened.

Specifically, referring to FIGS. 2 and 3, the inner diameter of the first screw 210 and the inner diameter of the second screw 220 are both d, the outer diameter of the first screw 210 and the outer diameter of the second screw 220 are both D, the center distance between the first screw 210 and the second screw 220 is C=(D+d)/2, the number of thread starts of the first screw 210 is set to n, the number of thread starts of the second screw 220 is set to m, and the following constraints are satisfied: n≤3 and m≤5. The end face curve of the first screw 210 includes an arc segment $N_1N_2$, a curve segment $N_2N_3$, an arc segment $N_3N_4$ and a curve segment $N_4N_5$. The end face curve of the second screw 220 includes an arc segment $M_1M_2$, a curve segment $M_2M_3$, an arc segment $M_3M_4$ and a curve segment $M_4M_5$, the curve segment $N_2N_3$ corresponds to the curve segment $M_2M_3$, the arc segment $N_3N_4$ corresponds to the arc segment $M_3M_4$, and the curve segment $N_4N_5$ corresponds to the curve segment $M_4M_5$. A rectangular plane coordinate system xoy is established. The end face center of the first screw 210 is $O_1$, the end face center of the second screw 220 is $O_2$, the coordinates of the end face center $O_1$ of the first screw 210 are (a, b), the coordinates of the end face center $O_2$ of the second screw 220 are (0,0), the included angle between a connecting line of a point on the end face curve of the first screw 210 and the end face center $O_1$ and $O_1O_2$ is $\theta 1$, and the included angle between a connecting line of a point on the end face curve of the second screw 220 and the end face center $O_2$ and $O_1O_2$ is $\theta_2$;

the equation of the arc segment $N_1N_2$ is:

$$\begin{cases} x = a + d/2 \cdot \cos\theta_1 \\ y = b + d/2 \cdot \sin\theta_1 \end{cases};$$

where $\theta_1 \in (-\pi/2m, 2\pi/n - 3\pi/2m]$;
the equation of the curve segment $N_2N_3$ is:

$$\begin{cases} x = a + C \cdot \cos\theta_1 - D/2 \cdot \cos(\pi/2m - 2\theta_1) \\ y = b - C \cdot \sin\theta_1 - D/2 \cdot \sin(\pi/2m - 2\theta_1) \end{cases};$$

where $\theta_1 \in (\pi/2m - \arccos(C/D), \pi/2m]$;
the equation of the arc segment $N_3N_4$ is:

$$\begin{cases} x = a + D/2 \cdot \cos\theta_1 \\ y = b + D/2 \cdot \sin\theta_1 \end{cases};$$

where $\theta_1 \in (-\pi/2m + (2m-1)\ \pi/m, \pi/2m + (2m-1)\ \pi/m]$;
the equation of the curve segment $N_4N_5$ is:

$$\begin{cases} x = a + C \cdot \cos\theta_1 - D/2 \cdot \cos(3\pi/2m - 2\theta_1) \\ y = b - C \cdot \sin\theta_1 - D/2 \cdot \sin(3\pi/2m - 2\theta_1) \end{cases};$$

where $\theta_1 \in (3\pi/2m, 3\pi/2m + \arccos(C/D)]$;
the equation of the arc segment $M_1M_2$ is:

$$\begin{cases} x = d/2 \cdot \cos\theta_2 \\ y = d/2 \cdot \sin\theta_2 \end{cases};$$

where $\theta_2 \in (-\pi/2m, \pi/2m]$;
the equation of the curve segment $M_2M_3$ is:

$$\begin{cases} x = C \cdot \cos\theta_2 - D/2 \cdot \cos(\pi/2m - 2\theta_2) \\ y = -C \cdot \sin\theta_2 - D/2 \cdot \sin(\pi/2m - 2\theta_2) \end{cases};$$

where $\theta_2 \in (\pi/2m - \arccos(C/D), \pi/2m]$;
the equation of the arc segment $M_3M_4$ is:

$$\begin{cases} x = D/2 \cdot \cos\theta_2 \\ y = D/2 \cdot \sin\theta_2 \end{cases};$$

where $\theta_2 \in (-\pi/2m + (2m-1)\ \pi/m, \pi/2m + (2m-1)\ \pi/m]$;
the equation of the curve segment $M_4M_5$ is:

$$\begin{cases} x = C \cdot \cos\theta_2 - D/2 \cdot \cos(3\pi/2m - 2\theta_2) \\ y = -C \cdot \sin\theta_2 - D/2 \cdot \sin(3\pi/2m - 2\theta_2) \end{cases};$$

where $\theta_2 \in (3\pi/2m, 3\pi/2m + \arccos(C/D)]$.

The end surface curve of the first screw 210 is composed of the arc segment $N_1N_2$, the curve segment $N_2N_3$, the arc segment $N_3N_4$ and the curve segment $N_4N_5$ connected in sequence, and the end surface curve of the second screw 220 is composed of the arc segment $M_1M_2$, the curve segment $M_2M_3$, the arc segment $M_3M_4$ and the curve segment $M_4M_5$ connected in sequence. In this way, the end surface curve assembly of the first screw 210 is composed of a plurality of identical parts arranged in a circular pattern, and the end surface curve assembly of the second screw 220 is composed of a plurality of identical parts arranged in a circular pattern.

Here, after the end surface curve of the first screw 210 and the end surface curve of the second screw 220 are formed, point $N_1$ and point $N_5$ coincide, as well as point $M_1$ and point $M_5$.

The rectangular plane coordinate system xoy is established. For the first screw 210, by connecting the arc segment $N_1N_2$, the curve segment $N_2N_3$, the arc segment $N_3N_4$, and the curve segment $N_4N_5$ in sequence and arranging them evenly around a circumference of the first screw 210 into n parts, the end face curve assembly of the first screw 210 can be obtained. For the second screw 220, by connecting the arc segment $M_1M_2$, the curve segment $M_2M_3$, the arc segment $M_3M_4$, and the curve segment $M_4M_5$ in sequence and arranging them evenly around a circumference of the second screw 220 into m parts, the end face curve assembly of the second screw 220 can be obtained.

It should be noted that the curve segment $N_2N_3$ corresponds to the curve segment $M_2M_3$, the arc segment $N_3N_4$ corresponds to the arc segment $M_3M_4$, and the curve segment $N_4N_5$ corresponds to the curve segment $M_4M_5$; and the equations of corresponding segments in the first screw 210 and the second screw 220 are the same, so they will not be repeated here.

By defining the end surface curves of the first screw 210 and the second screw 220, the first screw 210 can smoothly engage with the second screw 220, and the first screw 210 and the second screw 220 can maintain a good self-cleaning ability, thereby reducing adhesion of the material, avoiding degradation of product quality caused by residues during the manufacturing process, and improving the processing quality of the material.

Figure 5:
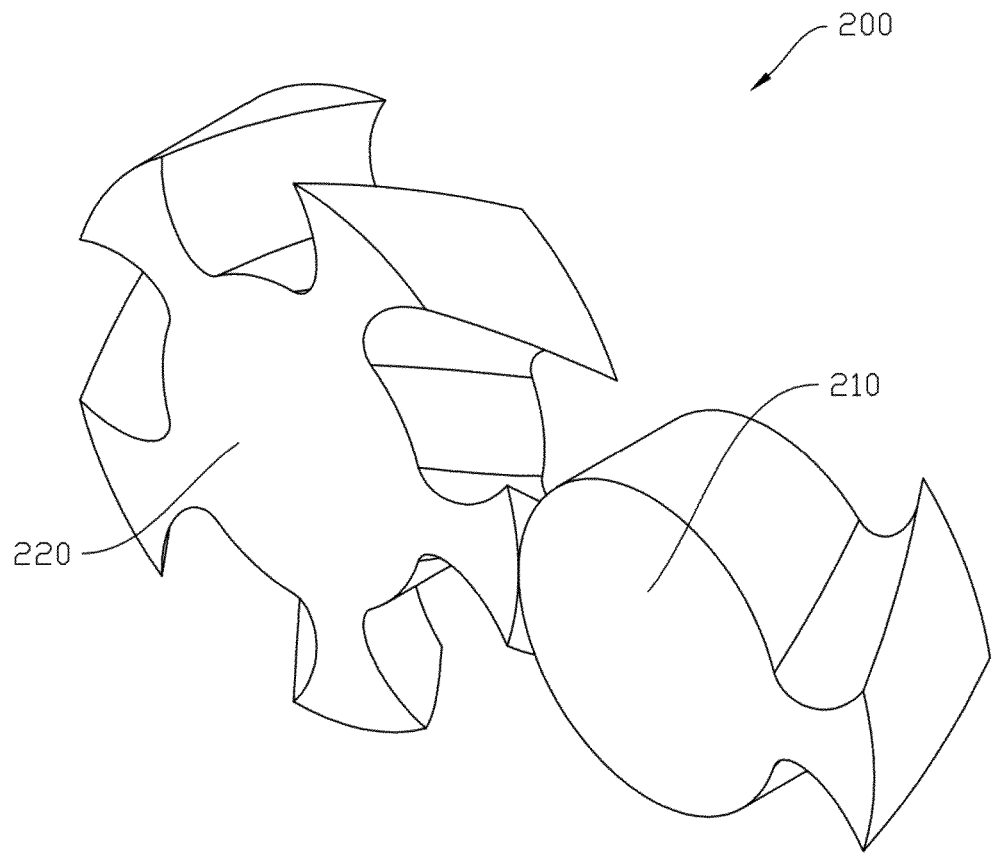
FIG. 5 is a schematic diagram of the second extrusion unit of the intermittent extrusion system according to an embodiment in the first aspect of the present disclosure.
Figure 6:
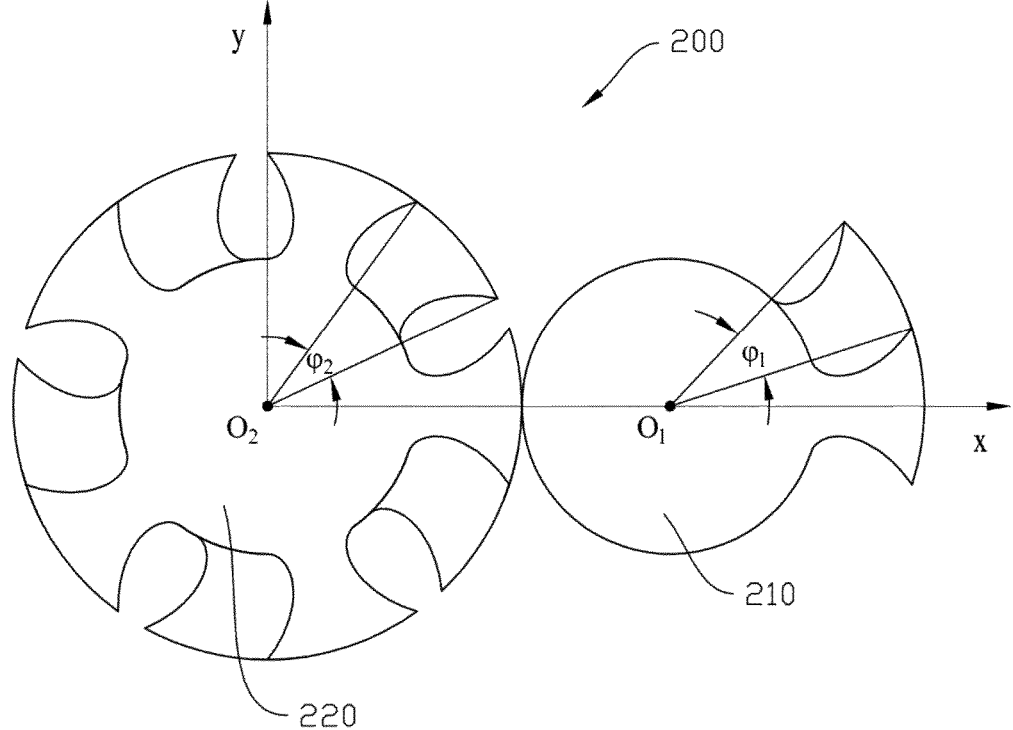
FIG. 6 is a schematic diagram of an end face of the second extrusion unit of the intermittent extrusion system according to an embodiment in the first aspect of the present disclosure.

Specifically, referring to FIGS. 5 and 6, the first screw 210 and the second screw 220 are both arranged in a staggered manner, the stagger angle of the first screw 210 is $\varphi_1$, the stagger angle of the second screw 220 is $\varphi_2$, the stagger direction of the first screw 210 is opposite to that of the second screw 220, and the following constraint is satisfied:

$$\varphi_1 = \varphi_2 \le \frac{\pi}{m}.$$

The first screw 210 and the second screw 220 are both arranged in a staggered manner, the stagger angle of the first screw 210 is set to $\varphi_1$, the stagger angle of the second screw 220 is set to $\varphi_2$, and $$\varphi_1 = \varphi_2 \le \frac{\pi}{m}.$$

In this way, the first screw 210 can smoothly engage with the second screw 220, and the contact time between the first screw 210 and the second screw 220 can be prolonged, thus strengthening the stretching, shearing, cutting, and displacement of the material, achieving the intermeshing of the left-right and front-rear screw groove configurations, increasing the interfacial area of the multiphase system, and enhancing the possibility of uniform distribution. Ultimately, this improves the dispersion and mixing effect of the material, accelerates material plasticization and enhances material mixing and homogenization.

It should be noted that the screw thread of the first screw 210 can extend anticlockwise in the circumferential direction, and the screw thread of the second screw 220 can extend clockwise in the circumferential direction, so that the first screw 210 can smoothly engage with the second screw 220.

Figure 7:
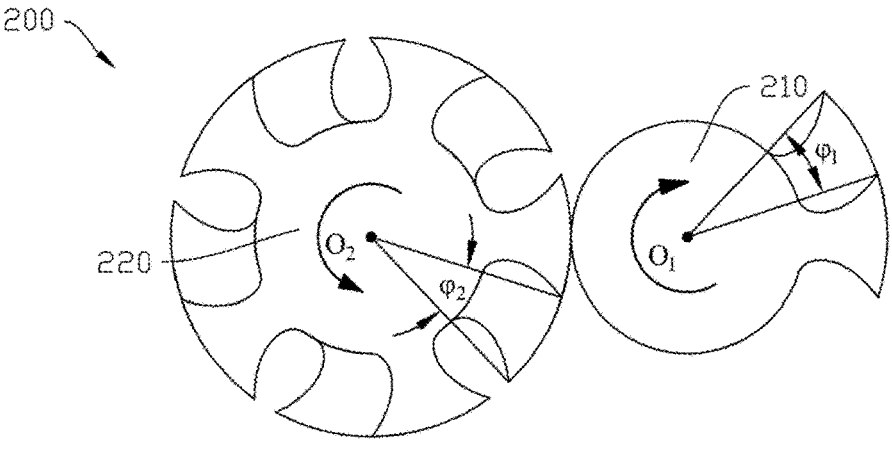
FIG. 7 is the first operation diagram of the extrusion unit of the intermittent extrusion system according to an embodiment in the first aspect of the present disclosure.
Figure 8:
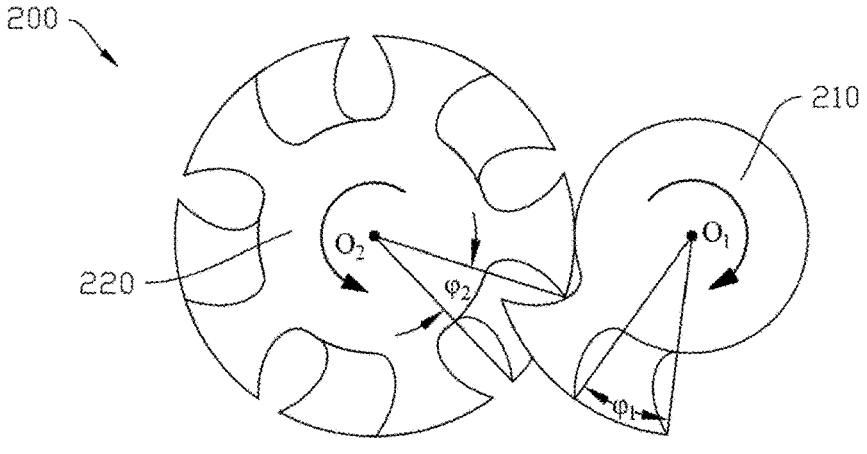
FIG. 8 is the second operation diagram of the extrusion unit of the intermittent extrusion system according to an embodiment in the first aspect of the present disclosure.
Figure 9:
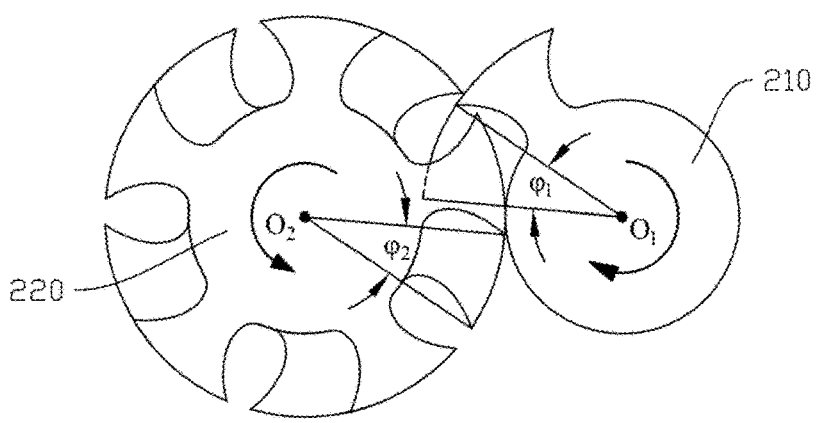
FIG. 9 is the third operation diagram of the extrusion unit of the intermittent extrusion system according to an embodiment in the first aspect of the present disclosure.

Specifically, referring to FIGS. 7-9, after the end face curve of the first screw 210 is formed, the end face of the first screw 210 rotates clockwise around the end face center $O_1$ by $\pi-\pi/n-\pi/m$ to define the initial position of the first screw 210.

After the end face curve of the second screw 220 is formed, the end face of the second screw 220 rotates anticlockwise around the end face center $O_2$ by $\pi/m$ to define the initial position of the second screw 220; the rotational angular velocity of the first screw 210 is $\omega$, and the motion state of the second screw 220 is as follows:

when the screw thread of the first screw 210 is in contact with screw thread of the second screw 220 for the first time:

static time: $t_1 \in (0, t_{1max}]$;

motion time: $t_2 \in (t_{1max}, t_{1max}+(2\pi/m+4\pi/2)/\omega]$;

static time: $t_3 \in (t_{2max}, t_{2max}+(2\pi/n-2\pi/m)/\omega]$;

when the screw thread of the first screw 210 is in contact with the screw thread of the second screw 220 for the second time and thereafter:

motion time: $t_4 \in (t_{3max}, t_{3max}+\pi/m]$;

static time: $t_5 \in (t_{4max}, t_{4max}+2\pi/n-2\pi/m]$;

where $t_{1max}=(\pi/n-\pi/m)/\omega$, and $t_{Qmax}$ represents the right boundary of the range of values for $t_{Q-1}$.

The initial positions of the first screw 210 and the second screw 220 are set as shown in FIG. 7. The first screw 210 rotates clockwise from the initial position, and the second screw 220 remains static during the process. Since the first screw 210 and the second screw 220 are both arranged in a staggered manner, when the screw thread of the first screw 210 and the screw thread of the second screw 220 make contact for the first time, the contact time and the rotational angle are both increased.

The first screw 210 rotates clockwise with time, and the rotational angular velocity of the first screw 210 is $\omega$. At time $t \in (0, u_1]$, the rotational angle of the first screw 210 is $\pi/n-\pi/m$, and the second screw 220 is static for a duration of $u_1=(\pi/n-\pi/m)/\omega$.

Referring to FIG. 8, at time $t \in (u_1, u_2]$, the first screw 210 rotates clockwise with time, the second screw 220 starts to move synchronously anticlockwise at a rotational speed of $\omega$ and an angle of $2\pi/m+4\pi/2$ for a duration of $(2\pi/m+(\pi/2)/@$, and $u_2=u_1+(2\pi/m+(\pi/2)/\omega$.

Referring to FIG. 9, at time $t \in (u_2, u_3]$, the second screw 220 has just rotated by the angle of a screw thread plus an additional angle of $\varphi_1/2$, and the first screw 210 rotates clockwise with time at an angle of $2\pi/n-2\pi/m$; and the second screw 220 starts to rest for a duration of $(2\pi/n-2\pi/m)/\omega$, and $u_3=u_2+(2\pi/n-2\pi/m)/\omega$.

When the screw thread of the first screw 210 is in contact with the screw thread of the second screw 220 for the second time:

At time $t \in (u_3, u_4]$, the first screw 210 rotates clockwise with time, the second screw 220 starts to move synchronously anticlockwise at a rotational speed of $\omega$ for a duration of $\pi/m$, and $u_4=u_3+\pi/m$.

At time $t \in (u_4, u_5]$, the first screw 210 keeps rotating, the second screw 220 rests for a duration of $(2/n-2\pi/m)/\omega$, and $u_5=u_4+2\pi/n-2\pi/m$.

In the subsequent time intervals $t \in (u_5, u_6] \ldots (u_{n-1}, u_n]$, the system undergoes a repetitive cycle, alternating between the processes corresponding to $t \in (u_3, u_4]$ and $t \in (u_4, u_5]$, until the first screw 210 completes m/n clockwise rotations and the second screw 220 completes one full anticlockwise rotation, thus completing one cycle of motion.

The material is continuously extruded into 1/m screw grooves of the second screw 220 from the screw grooves of the first screw 210. In the next cycle, m parts of the material in the screw grooves of the second screw 220 are collected into n screw grooves of the first screw 210, so that the material undergoes constant stretching, shearing, segmentation, and displacement, which accelerates material plasticization and enhances material mixing. Meanwhile, the viscoelastic polymer material moves within the screw grooves of the first screw 210 and remains stationary within the screw grooves of the second screw 220, causing the material to be stretched and facilitating the recovery of oriented high molecular chains. Upon further movement, the material undergoes stretching in different directions, and this continuous process of stretching and recovery strengthens the homogenization process of the material.

It can be understood that, referring to FIG. 3, the number of thread starts of the first screw 210 is set to n=1, and the number of thread starts of the second screw 220 is set to m=5; the end surface curve of the first screw 210 is formed by sequentially connecting the arc segment $N_1N_2$, the curve segment $N_2N_3$, the arc segment $N_3N_4$ and the curve segment $N_4N_5$. The end surface curve assembly of the second screw 220 is formed by sequentially connecting five parts in the circumferential direction, and each part is formed by sequentially connecting the arc segment $M_1M_2$, the curve segment $M_2M_3$, the arc segment $M_3M_4$ and the curve segment $M_4M_5$. The coordinates of the end surface center $O_1$ of the first screw 210 are (a, b), and the coordinates of the end surface center $O_2$ of the second screw 220 are (0,0); and the included angle between the connecting line of the point on the end face curve of the first screw 210 and the end face center $O_1$ and $O_1O_2$ is $\theta_1$, and the included angle between the connecting line of the point on the end face curve of the second screw 220 and the end face center $O_2$ and $O_1O_2$ is $\theta_2$.

The equations of each segment of the curve of the first screw 210 are as follows:

the equation of the arc segment $N_1N_2$ is:

$$\begin{cases} x = a + d/2 \cdot \cos\theta_1 \\ y = b + d/2 \cdot \sin\theta_1 \end{cases};$$

where $\theta_1 \in (-\pi/10, 17\pi/10]$;

the equation of the curve segment $N_2N_3$ is:

$$\begin{cases} x = a + C \cdot \cos\theta_1 - D/2 \cdot \cos(\pi/10 - 2\theta_1) \\ y = b - C \cdot \sin\theta_1 - D/2 \cdot \sin(\pi/10 - 2\theta_1) \end{cases};$$

where $\theta_1 \in (\pi/10 - \arccos(C/D), \pi/10]$;

the equation of the arc segment $N_3N_4$ is:

$$\begin{cases} x = a + D/2 \cdot \cos\theta_1 \\ y = b + D/2 \cdot \sin\theta_1 \end{cases};$$

where $\theta_1 \in (17\pi/10, 19\ \pi/10]$;

the equation of the curve segment $N_4N_5$ is:

$$\begin{cases} x = a + C \cdot \cos\theta_1 - D/2 \cdot \cos(3\pi/10 - 2\theta_1) \\ y = b - C \cdot \sin\theta_1 - D/2 \cdot \sin(3\pi/10 - 2\theta_1) \end{cases};$$

where $\theta_1 \in (3\pi/10, 3\pi/10 + \arccos(C/D)]$;

The equations of each segment of the curve of the second screw 220 are as follows:

the equation of the arc segment $M_1M_2$ is:

$$\begin{cases} x = d/2 \cdot \cos\theta_2 \\ y = d/2 \cdot \sin\theta_2 \end{cases};$$

where $\theta_2 \in (-\pi/10, \pi/10]$;

the equation of the curve segment $M_2M_3$ is:

$$\begin{cases} x = C \cdot \cos\theta_2 - D/2 \cdot \cos(\pi/10 - 2\theta_2) \\ y = -C \cdot \sin\theta_2 - D/2 \cdot \sin(\pi/10 - 2\theta_2) \end{cases};$$

where $\theta_2 \in (\pi/10 - \arccos(C/D), \pi/10]$;

the equation of the arc segment $M_3M_4$ is:

$$\begin{cases} x = D/2 \cdot \cos\theta_2 \\ y = D/2 \cdot \sin\theta_2 \end{cases};$$

where $\theta_2 \in (17\pi/10, 19\pi/10]$;

the equation of the curve segment $M_4M_5$ is:

$$\begin{cases} x = C \cdot \cos\theta_2 - D/2 \cdot \cos(3\pi/10 - 2\theta_2) \\ y = -C \cdot \sin\theta_2 - D/2 \cdot \sin(3\pi/10 - 2\theta_2) \end{cases};$$

where $\theta_2 \in (3\pi/10, 3\pi/10 + \arccos(C/D)]$.

Assuming that the rotation period of the first screw 210 is T, the first screw 210 has a single thread start and the second screw 220 has five thread starts, when the first screw 210 starts to rotate clockwise from the initial position, the second screw 220 is stationary during this process.

When the first screw 210 rotates clockwise by $4\pi/5$, the first screw 210 contacts the second screw 220 for the first time, and the second screw 220 starts to synchronously move anticlockwise at the same speed as the first screw 210 by $2\pi/5 + 4\pi/2$ for a duration of $T/5 + \varphi_1/2\omega$. Here, when the stagger angle of the first screw 210 and the second screw 220 is 0, $\varphi_1 = \varphi_2 = 0$.

When the first screw 210 rotates clockwise again, the second screw 220 remains stationary until the first screw 210 completes another $8\pi/5$ radians of clockwise rotation for a duration $4\pi/5$. At this point, the first screw 210 and the second screw 220 make contact for the second time. The second screw 220 then begins to move synchronously anticlockwise at the same speed as the first screw 210 for a duration of $\pi/5$, covering an angle of $2\pi/5$.

Starting from contact for the second time, the first screw 210 and the second screw 220 complete one cycle of motion during which the first screw 210 completes 5 clockwise rotations and the second screw 220 completes one anticlockwise rotation.

Figure 4:
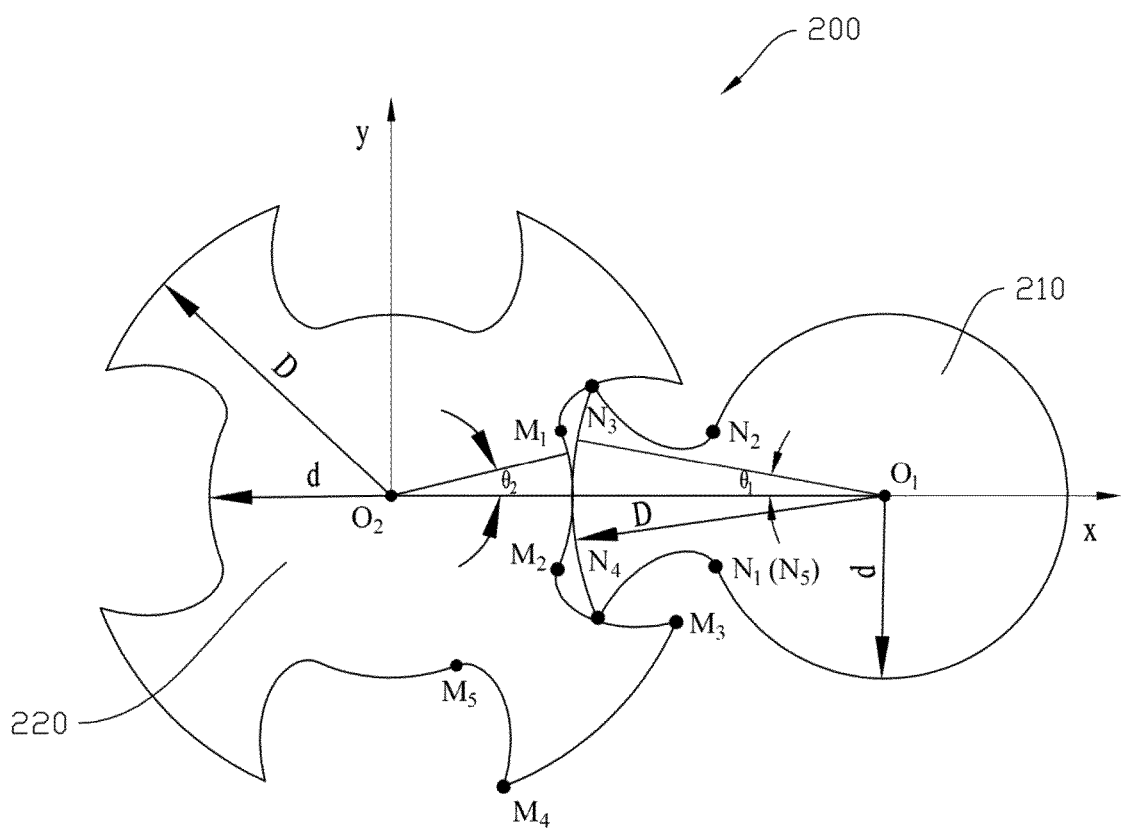
FIG. 4 is a schematic diagram of the extrusion unit, featuring m=4 and n=1, of the intermittent extrusion system according to an embodiment in the first aspect of the present disclosure.

It can be understood that, referring to FIG. 4, the number of thread starts of the first screw 210 is set to n=1, and the number of thread starts of the second screw 220 is set to m=4; the end surface curve of the first screw 210 is formed by sequentially connecting the arc segment $N_1N_2$, the curve segment $N_2N_3$, the arc segment $N_3N_4$ and the curve segment $N_4N_5$; the end surface curve assembly of the second screw 220 is formed by sequentially connecting four parts in the circumferential direction, and each part is formed by sequentially connecting the arc segment $M_1M_2$, the curve segment $M_2M_3$, the arc segment $M_3M_4$ and the curve segment $M_4M_5$. The coordinates of the end surface center $O_1$ of the first screw 210 are (a, b), and the coordinates of the end surface center $O_2$ of the second screw 220 are (0,0); and the included angle between the connecting line of the point on the end face curve of the first screw 210 and the end face center $O_1$ and $O_1O_2$ is $\theta_1$, and the included angle between the connecting line of the point on the end face curve of the second screw 220 and the end face center $O_2$ and $O_1O_2$ is $\theta_2$.

The equations of each segment of the curve of the first screw 210 are as follows:

$$\begin{cases} x = a + d/2 \cdot \cos\theta_1 \\ y = b + d/2 \cdot \sin\theta_1 \end{cases};$$

the equation of the arc segment $N_1N_2$ is:
where $\theta_1 \in (-\pi/8, 13\pi/8]$;
the equation of the curve segment $N_2N_3$ is:

$$\begin{cases} x = a + C \cdot \cos\theta_1 - D/2 \cdot \cos(\pi/8 - 2\theta_1) \\ y = b - C \cdot \sin\theta_1 - D/2 \cdot \sin(\pi/8 - 2\theta_1) \end{cases};$$

where $\theta_1 \in (\pi/8 - \arccos(C/D), \pi/8]$;

$$\begin{cases} x = a + D/2 \cdot \cos\theta_1 \\ y = b + D/2 \cdot \sin\theta_1 \end{cases};$$

the equation of the arc segment $N_3N_4$ is:
where $\theta_1 \in (13\pi/8, 15\ \pi/8]$;

the equation of the curve segment $N_4N_5$ is:

$$\begin{cases} x = a + C \cdot \cos\theta_1 - D/2 \cdot \cos(3\pi/8 - 2\theta_1) \\ y = b - C \cdot \sin\theta_1 - D/2 \cdot \sin(3\pi/8 - 2\theta_1) \end{cases};$$

where $\theta_1 \in (3\pi/8, 3\pi/8 + \arccos(C/D)]$;

The equations of each segment of the curve of the second screw 220 are as follows:

$$\begin{cases} x = d/2 \cdot \cos\theta_2 \\ y = d/2 \cdot \sin\theta_2 \end{cases};$$

the equation of the arc segment $M_1M_2$ is:
where $\theta_2 \in (-\pi/8, \pi/8]$;
the equation of the curve segment $M_2M_3$ is:

$$\begin{cases} x = C \cdot \cos\theta_2 - D/2 \cdot \cos(\pi/8 - 2\theta_2) \\ y = -C \cdot \sin\theta_2 - D/2 \cdot \sin(\pi/8 - 2\theta_2) \end{cases};$$

where $\theta_2 \in (\pi/8 - \arccos(C/D), \pi/8]$;
the equation of the arc segment $M_3M_4$ is:

$$\begin{cases} x = D/2 \cdot \cos\theta_2 \\ y = D/2 \cdot \sin\theta_2 \end{cases};$$

where $\theta_2 \in (13\pi/8, 15\pi/8]$;
the equation of the curve segment $M_4M_5$ is:

$$\begin{cases} x = C \cdot \cos\theta_2 - D/2 \cdot \cos(3\pi/8 - 2\theta_2) \\ y = -C \cdot \sin\theta_2 - D/2 \cdot \sin(3\pi/8 - 2\theta_2) \end{cases};$$

where $\theta_2 \in (3\pi/8, 3\pi/8 + \arccos(C/D)]$.

The number of thread start of the first screw 210 is set to n=1, and the end surface curve of the first screw 210 is composed of the arc segment $N_1N_2$, the curve segment $N_2N_3$, the arc segment $N_3N_4$ and the curve segment $N_4N_5$ connected in sequence.

Assuming that the rotation period of the first screw 210 is T, the first screw 210 has a single thread start and the second screw 220 has four thread starts, when the first screw 210 starts to rotate clockwise from the initial position, the second screw 220 is stationary during this process.

When the first screw 210 rotates by $7\pi/8$, the first screw 210 contacts the second screw 220 for the first time, and the second screw 220 starts to synchronously move anticlockwise at the same speed as the first screw 210 by $\pi/2 + 4\pi/2$ for a duration of $\pi/4 + \varphi_1/2\omega$. Here, when the stagger angle of the first screw 210 and the second screw 220 is 0, $\varphi_1 = \varphi_2 = 0$.

When the first screw 210 rotates clockwise again, the second screw 220 remains stationary until the first screw 210 completes another $3\pi/2$ radians of clockwise rotation. At this point, the first screw 210 and the second screw 220 make contact for the second time. The second screw 220 then begins to move synchronously anticlockwise at the same speed as the first screw 210 for a duration of $\pi/4$, covering an angle of $\pi/2$.

Starting from contact for the second time, the first screw 210 and the second screw 220 complete one cycle of motion during which the first screw 210 completes 4 clockwise rotations and the second screw 220 completes one anticlockwise rotation.

Figure 10:
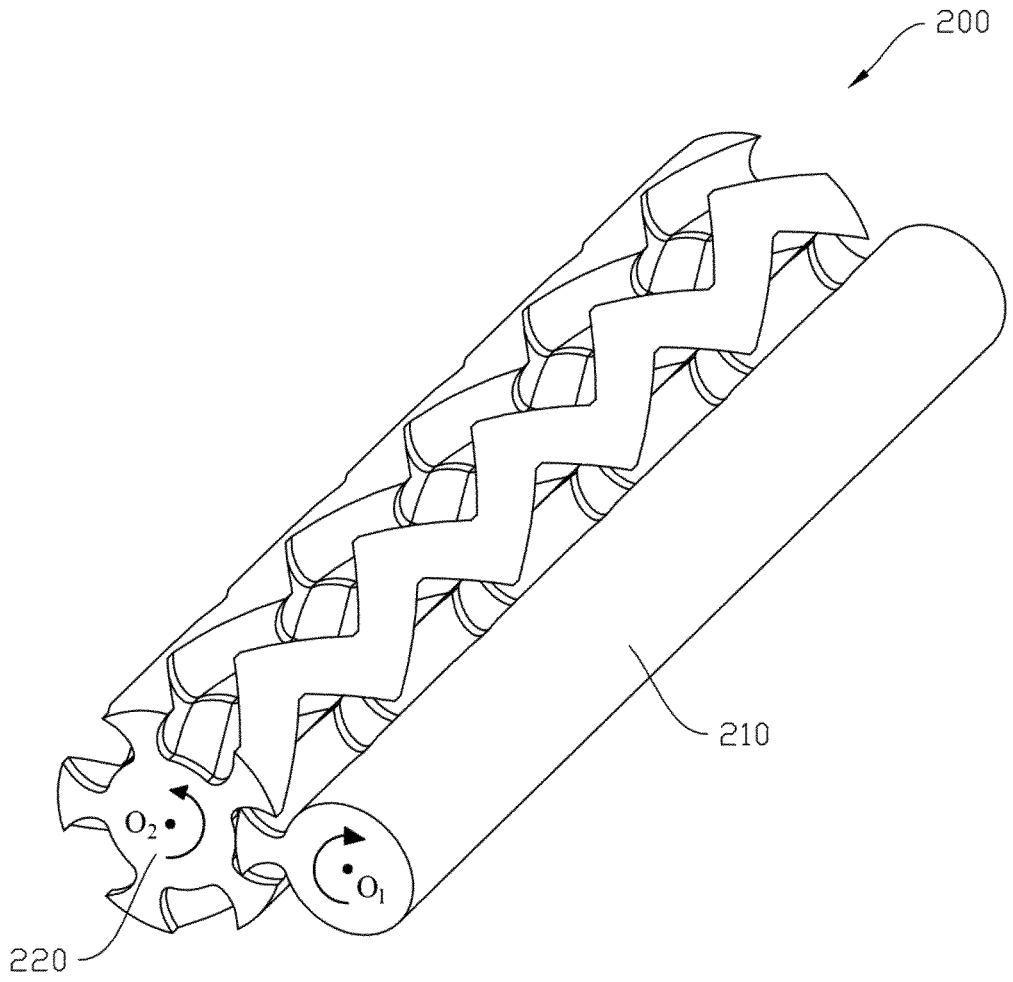
FIG. 10 is a schematic diagram of the third extrusion unit of the intermittent extrusion system according to an embodiment in the first aspect of the present disclosure.
Figure 11:
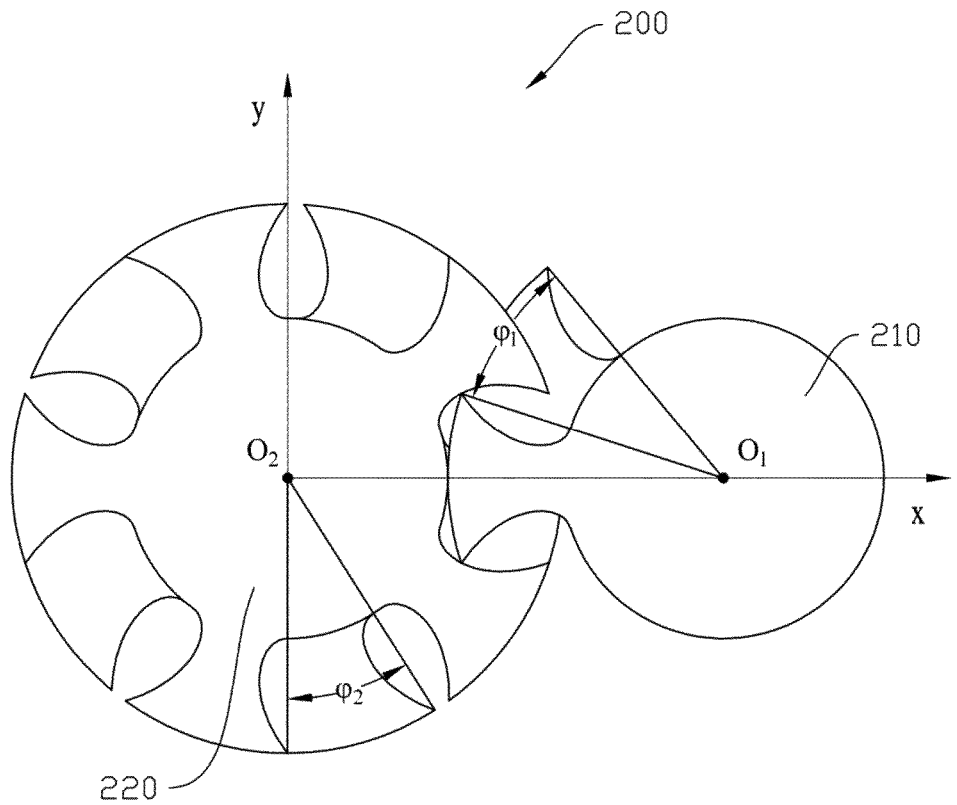
FIG. 11 is a schematic diagram of an end face of the third extrusion unit of the intermittent extrusion system according to an embodiment in the first aspect of the present disclosure.

Specifically, referring to FIGS. 10 and 11, in a length direction of the barrel 100, the screw thread of the first screw 210 and the screw thread of the second screw 220 are set to be in a wave shape. By employing a wave shape for the screw threads of the first screw 210 and the second screw 220, the flow path of the material can be altered when the first screw 210 and the second screw 220 engage, resulting in a change in the orientation of the dispersion phase. Additionally, this design increases the residence time of the material, promoting its melting and mixing, and enhancing the mixing properties of the material.

It can be understood that, referring to FIG. 12, the extrusion device according to the embodiment in the second aspect of the present disclosure including the intermittent extrusion system according to the embodiment in the first aspect of the present disclosure also has the beneficial effects of all the above embodiments since it has all the technical features of the intermittent extrusion system, which will not be repeated here.

It should be noted that the barrel 100 is provided with a feed inlet 110 through which the material is fed into the barrel 100. The first motor 311, the first speed reducer 312, the second motor 321 and the second speed reducer 322 cooperate to drive the first screw 210 and the second screw 220 to rotate. An outer wall of the barrel 100 is provided with a heating mechanism 120. By the heating mechanism 120 and viscous heat dissipation, the material can be melted and changed from the glass state to the elastomeric state and then to the viscous flow state, so that the material can be plasticized and homogenized easily.

In the direction of material transport, the extrusion unit 200 can be sequentially configured with partially meshing or non-meshing asymmetric twin screws or large-pitch intermittent meshing mixing elements, intermittent meshing mixing elements and wave-shaped asymmetric mixing elements. Material transport is achieved through the partially meshing or non-meshing asymmetric twin screws, or large-pitch intermittent meshing elements. The intermittent meshing mixing elements include the first screw 210 and the second screw 220. The first screw 210 moves continuously, causing the material in the screw grooves of the first screw 210 close to the inner wall of the barrel 100 to melt into a fluid. During the movement, a melt pool is formed and conveyed to the screw groove of the second screw 220. At the same time, the unmelted glassy material in the screw groove of the second screw 220 is conveyed to the screw grooves of the first screw 210, completing the melting process again. Then, the wave-shaped asymmetric mixing elements change the movement trajectory and direction of the material during the later stage of material melting and the homogenization phase, increasing the material residence time, promoting melting and mixing of the material in this section, and improving the processing quality of the material.

Although the embodiments of the present disclosure have been described in detail above with reference to the accompanying drawings, the present disclosure is not limited to the above embodiments, and various changes may be made within the knowledge of those of ordinary skill in the art without departing from the purpose of the present disclosure.

What is claimed is:

1. An intermittent extrusion system, comprising:

a barrel; and an extrusion unit, the extrusion unit comprising a first screw and a second screw, both the first screw and the second screw being installed in the barrel, both the first screw and the second screw being able to rotate in the barrel, a screw thread of the first screw being able to mesh with a screw groove of the second screw, the first screw having at least one thread start, and the second screw having at least one thread start;

wherein the first screw is configured to rotate at a constant speed, while the second screw is configured to rotate intermittently, and a rotating direction of the first screw is opposite to that of the second screw;

wherein an inner diameter of the first screw and an inner diameter of the second screw are both d, an outer diameter of the first screw and an outer diameter of the second screw are both D, a center distance between the first screw and the second screw is C=(D+d)/2, the number of thread starts of the first screw is set to n, the number of thread starts of the second screw is set to m, and the following constraints are satisfied:

$$n \leq 3 \text{ and } m \leq 5;$$

an end face curve of the first screw comprises an arc segment $N_1N_2$, a curve segment $N_2N_3$, an arc segment $N_3N_4$ and a curve segment $N_4N_5$, an end face curve of the second screw comprises an arc segment $M_1M_2$, a curve segment $M_2M_2$, an arc segment $M_3M_4$ and a curve segment $M_4M_5$, the curve segment $N_2N_3$ corresponds to the curve segment $M_2M_3$, the arc segment $N_3N_4$ corresponds to the arc segment $M_3M_4$, and the curve segment $N_4N_5$ corresponds to the curve segment $M_4M_5$;

a rectangular plane coordinate system xoy is established, an end face center of the first screw is $O_1$, an end face center of the second screw is $O_2$, coordinates of the end face center $O_1$ of the first screw are (a, b), coordinates of the end face center $O_2$ of the second screw are (0,0), an included angle between a connecting line of a point on the end face curve of the first screw and the end face center $O_1$ and $O_1O_2$ is $\theta_1$, and an included angle between a connecting line of a point on the end face curve of the second screw and the end face center $O_2$ and $O_1O_2$ is $\theta_2$;

an equation of the arc segment $N_1N_2$ is:

$$\begin{cases} x = a + d/2 \cdot \cos\theta_1 \\ y = b + d/2 \cdot \sin\theta_1 \end{cases};$$

where $\theta_1 \in (-\pi/2m, 2\pi/n - 3\pi/2m]$;
an equation of the curve segment $N_2N_3$ is:

$$\begin{cases} x = a + C \cdot \cos\theta_1 - D/2 \cdot \cos(\pi/2m - 2\theta_1) \\ y = b - C \cdot \sin\theta_1 - D/2 \cdot \sin(\pi/2m - 2\theta_1) \end{cases};$$

where $\theta_1 \in (\pi/2m - \arccos(C/D), \pi/2m]$;
an equation of the arc segment $N_3N_4$ is:

$$\begin{cases} x = a + D/2 \cdot \cos\theta_1 \\ y = b + D/2 \cdot \sin\theta_1 \end{cases};$$

where $\theta_1 \in (-\pi/2m + (2m-1)\pi/m, \pi/2m + (2m-1)\pi/m]$;
an equation of the curve segment $N_4N_5$ is:

$$\begin{cases} x = a + C \cdot \cos\theta_1 - D/2 \cdot \cos(3\pi/2m - 2\theta_1) \\ y = b - C \cdot \sin\theta_1 - D/2 \cdot \sin(3\pi/2m - 2\theta_1) \end{cases};$$

where $\theta_1 \in (3\pi/2m, 3\pi/2m + \arccos(C/D)]$;
an equation of the arc segment $M_1M_2$ is:

$$\begin{cases} x = d/2 \cdot \cos\theta_2 \\ y = d/2 \cdot \sin\theta_2 \end{cases};$$

where $\theta_2 \in (-\pi/2m, \pi/2m]$;
an equation of the curve segment $M_2M_3$ is:

$$\begin{cases} x = C \cdot \cos\theta_2 - D/2 \cdot \cos(\pi/2m - 2\theta_2) \\ y = -C \cdot \sin\theta_2 - D/2 \cdot \sin(\pi/2m - 2\theta_2) \end{cases};$$

where $\theta_2 \in (\pi/2m - \arccos(C/D), \pi/2m]$;
an equation of the arc segment $M_3M_4$ is:

$$\begin{cases} x = D/2 \cdot \cos\theta_2 \\ y = D/2 \cdot \sin\theta_2 \end{cases};$$

where $\theta_2 \in (-\pi/2m + (2m-1)\pi/m, \pi/2m + (2m-1)\pi/m]$;
an equation of the curve segment $M_4M_5$ is:

$$\begin{cases} x = C \cdot \cos\theta_2 - D/2 \cdot \cos(3\pi/2m - 2\theta_2) \\ y = -C \cdot \sin\theta_2 - D/2 \cdot \sin(3\pi/2m - 2\theta_2) \end{cases};$$

where $\theta_2 \in (3\pi/2m, 3\pi/2m + \arccos(C/D)]$.

2. The intermittent extrusion system of claim 1, wherein the first screw and the second screw are both arranged in a staggered manner, a stagger angle of the first screw is $\varphi_1$, a stagger angle of the second screw is $\varphi_2$, a stagger direction of the first screw is opposite to that of the second screw, and the following constraint is satisfied:

$$\varphi_1 = \varphi_2 \leq \frac{\pi}{m}.$$

3. The intermittent extrusion system of claim 2, wherein after the end face curve of the first screw is formed, an end face of the first screw rotates clockwise around the end face center $O_1$ by $\pi - \pi/n - \pi/m$ to define an initial position of the first screw;

after the end face curve of the second screw is formed, an end face of the second screw rotates anticlockwise around the end face center $O_2$ by $\pi/m$ to define an initial position of the second screw;

a rotational angular velocity of the first screw is $\omega$, and a motion state of the second screw is as follows:

when the screw thread of the first screw is in contact with the screw thread of the second screw for the first time:

static time: $t_1 \in (0, t_{1max}]$;

motion time: $t_2 \in (t_{1max}, t_{1max}+(2\pi/m+\varphi_1/2)/\omega]$;

static time: $t_3 \in (t_{2max}, t_{2max}+(2\pi/n-2\pi/m)/\omega]$;

when the screw thread of the first screw is in contact with the screw thread of the second screw for the second time and thereafter:

motion time: $t_4 \in (t_{3max}, t_{3max}+T/m]$;

static time: $t_5 \in (t_{4max}, t_{4max}+2\pi/n-2\pi/m]$;

where $t_{1max}=(\pi/n-\pi/m)/\omega$, and $t_{Qmax}$ represents a right boundary of a range of values for $t_{Q-1}$.

4. The intermittent extrusion system of claim 1, wherein in a length direction of the barrel, the screw thread of the first screw and the screw thread of the second screw are set to be in a wave shape.

5. An extrusion device, comprising the intermittent extrusion system of claim 1.

* * * * *